UNITED STATES PATENT OFFICE.

ROBERT DEMUTH, OF ELBERFELD, GERMANY, ASSIGNOR TO THE FARBENFABRIKEN OF ELBERFELD COMPANY, OF NEW YORK, N. Y.

VIOLET COTTON-DYE AND PROCESS OF MAKING SAME.

SPECIFICATION forming part of Letters Patent No. 656,631, dated August 28, 1900.

Application filed June 15, 1899. Serial No. 720,670. (Specimens.)

*To all whom it may concern:*

Be it known that I, ROBERT DEMUTH, doctor of philosophy and chemist, of Elberfeld, Germany, (assignor to the FARBENFABRIKEN OF ELBERFELD COMPANY, of New York,) have invented a new and useful Improvement in the Manufacture of Violet Cotton-Dyes; and I do hereby declare the following to be an exact and clear description thereof.

My invention relates to the production of a new class of violet cotton-dyestuffs by subjecting at elevated temperatures amido-1.8-dioxynaphthalene sulfo-acids or salts thereof to the action of alkaline sulfid-carrying compounds in the presence of zinc, (using either metallic zinc, such as zinc dust, or any zinc compound.) According to my researches, in place of the said amido-1.8-dioxynaphthalene-sulfo-acids all those substances (such as nitroso-1.8-dioxynaphthalene sulfo-acids, the azo coloring-matters obtainable from 1.8-dioxynaphthalenesulfo acids by the combination with diazotized amido compounds, or the like,) which under the influence of the alkaline sulfid-carrying compounds are first transformed into amido-1.8-dioxynaphthalenesulfo-acids can also be used. Naturally I need not specifically claim the use of these substances, as they by the reducing action of the alkaline sulfid-carrying compounds are first converted into amido-1.8-dioxynaphthalenesulfo-acids, and the amido acids thus formed subsequently yield the final dyestuffs.

The coloring-matters produced by means of this new process can be directly employed for dyeing purposes. They form blackish powdery masses, for the greatest part soluble in hot water, in hot dilute soda-lye, in hot dilute sodium carbonate solution, and in concentrated sulfuric acid (66° Baumé) with a reddish-violet color. From their solutions in water they are precipitated again by the addition of dilute mineral acids, sulfureted hydrogen being set free at the same time. They dye unmordanted cotton in boiling baths containing common salt and sodium carbonate violet shades, which withstand the action of alkalies and are sufficiently fast to the action of light.

In order to carry out my process practically, I can proceed as follows without limiting myself to the details given. The parts are by weight. Thirty parts of nitroso-1.8-dioxynaphthalene-2.4-disulfo-acid are mixed with twenty parts of water. After the addition of eighty-two parts of soda-lye (containing thirty per cent. NaOH) twenty parts of dry zinc chlorid are stirred into the liquid mixture. Stirring is continued for some time, and subsequently sixty-six parts of dry sodium sulfid and sixty parts of flowers of sulfur are added. The resulting mixture is slowly heated in an open iron vessel, profitably by means of a metallic bath, to 200° centigrade, (temperature of the bath,) taking care that the mass is well stirred. The original stiff mixture when heated first becomes liquid and forms at about 200° centigrade a dry mass, which can be easily pulverized to form a powder. At this stage the vessel is closed. The temperature of the bath is kept for, say, two hours at 200° centigrade. Subsequently it is raised to 240° centigrade, and heating at this temperature is continued for about two hours, until test portions of the melt dissolve in hot water with a reddish-violet color and the intensity of this color no longer increases. The product thus obtained when cold can be directly used for dyeing purposes. It forms a blackish powdery mass, for the greatest part soluble in hot water, in hot dilute soda-lye, in hot dilute sodium carbonate solution, and in concentrated sulfuric acid (66° Baumé) with a reddish-violet color. From its solutions in water it is precipitated by the addition of dilute mineral acids, sulfureted hydrogen being set free at the same time. It dyes unmordanted cotton in boiling baths containing common salt and sodium carbonate bright bluish-violet shades, which withstand the action of alkalies and are sufficiently fast to the action of light.

The process proceeds in an analogous manner if in place of zinc chlorid, used in the above example, other zinc compounds—such as zinc sulfate, zinc carbonate, zinc oxid, or the like, or metallic zinc itself, preferably in the form of zinc dust—are employed. The sodium sulfid and sulfur prescribed in the above example can be replaced by other alkaline sulfid-carrying compounds, such as sulfur and potassium sulfid, sulfur and soda, sulfur and potassa, sodium polysulfid, potassium polysulfid, or the like. A similar result is obtained if other nitroso-1.8-dioxynaphthalenesulfo acids, such as nitroso-1.8-dioxynaphthalene-4-monosulfo acid or the like, are used in place of nitroso-1.8-dioxynaphthalene-2.4-disulfo acid. As above mentioned, the nitroso-dioxynaphthalenesulfo-acids are by the reducing action of the alkaline sulfid-carrying compounds first converted into amido-1.8-dioxynaphthalenesulfo acids, which yield the final dyestuffs. The same effect is attained if azo dyestuffs of 1.8-dioxynaphthalenesulfo acids, such as the coloring-matters obtained by means of diazotized anilin, naphthylamin, or the like, are employed. In this case the azo dyestuffs used are by the action of the alkaline sulfid-carrying compounds first split, amido-1.8-dioxynaphthalenesulfo acids and anilin, naphtylamin, or the like being produced, so that the resulting amido-1.8-dioxynaphthalenesulfo acids yield by the further action of the alkaline sulfid-carrying compounds and zinc the finished dyestuffs, whereas the regenerated amido compounds volatilize or are not acted upon under the above conditions. The process is carried out in the same manner if the complete amido-1.8-dioxynaphthalenesulfo acids are used. These amido acids can be obtained, for instance, by reducing nitroso-1.8-dioxynaphthalenesulfo acids or the azo dyestuffs resulting from the combination of diazo compounds with 1.8-dioxynaphthalenesulfo acids.

Having now described my invention and in what manner the same is to be performed, what I claim as new, and desire to secure by Letters Patent, is—

1. The process for the production of new dyes giving violet shades on unmordanted cotton which process consists in subjecting at elevated temperatures amido-1.8-dioxynaphthalenesulfo acids to the action of an alkaline sulfid-carrying compound and zinc which may be also employed in the form of a zinc compound substantially as described.

2. The process for producing a new dye giving bluish-violet shades in baths containing common salt and sodium carbonate, which process consists in subjecting at elevated temperatures amido-1.8-dioxynaphthalene-2.4-disulfo acid to the action of alkaline sulfid, sulfur and zinc chloride substantially as described.

3. As new articles of manufacture the violet cotton-dyes obtainable from amido-1.8-dioxynaphthalenesulfo acids by the action of alkaline sulfid-carrying compounds and zinc which may be also employed in the form of a zinc compound at elevated temperatures, forming blackish powdery masses, for the greatest part soluble in hot water, in hot dilute soda-lye, in hot dilute sodium carbonate solution and in concentrated sulfuric acid (66° Baumé) with a reddish-violet color, being precipitated from their solutions in water by the addition of mineral acids, sulfureted hydrogen being set free at the same time, producing on unmordanted cotton in boiling baths containing common salt and sodium carbonate violet shades fast to the action of alkalies and sufficiently withstanding the action of light, substantially as described.

4. As a new article of manufacture the specific dye obtainable from amido-1.8-dioxynaphthalene-2.4-disulfo acid by the action of alkaline sulfid-carrying compounds and zinc chloride at elevated temperatures forming a blackish powdery mass, for the greatest part soluble in hot water, in hot dilute soda-lye, in hot dilute sodium carbonate solution and in concentrated sulfuric acid (66° Baumé) with a reddish-violet color, being precipitated from its solution in water by the addition of mineral acids, sulfureted hydrogen being set free at the same time, dyeing unmordanted cotton in baths containing common salt and sodium carbonate bright bluish-violet shades fast to the action of alkalies and sufficiently withstanding the action of light, substantially as described.

In testimony whereof I have signed my name in the presence of two subscribing witnesses.

ROBERT DEMUTH.

Witnesses:
R. E. JAHN,
OTTO KÖNIG.